(12) United States Patent
Liotta et al.

(10) Patent No.: US 8,592,094 B2
(45) Date of Patent: Nov. 26, 2013

(54) MEMBRANE ELECTROCHEMICAL GENERATOR

(75) Inventors: Marcello Liotta, Rozzano (IT); Eduardo Trifoni, Naples (IT)

(73) Assignee: Nuvera Fuel Cells Europe S.R.L., Milan (IT)

( * ) Notice: Subject to any disclaimer, the term of this patent is extended or adjusted under 35 U.S.C. 154(b) by 75 days.

(21) Appl. No.: 12/839,066

(22) Filed: Jul. 19, 2010
(Under 37 CFR 1.47)

(65) Prior Publication Data

US 2011/0033767 A1 Feb. 10, 2011

Related U.S. Application Data

(62) Division of application No. 10/524,040, filed as application No. PCT/EP03/09554 on Aug. 28, 2003, now Pat. No. 8,062,805.

(30) Foreign Application Priority Data

Aug. 28, 2002 (IT) .............................. MI2002A1859

(51) Int. Cl.
*H01M 8/04* (2006.01)
*H01M 8/10* (2006.01)

(52) U.S. Cl.
USPC ............ 429/457; 429/437; 429/463; 429/518

(58) Field of Classification Search
None
See application file for complete search history.

(56) References Cited

U.S. PATENT DOCUMENTS

| 4,678,724 A | 7/1987 | McElroy |
| 4,737,257 A | 4/1988 | Boulton |
| 5,858,567 A | 1/1999 | Spear et al. |
| 6,835,477 B1 | 12/2004 | Brambilia et al. |

FOREIGN PATENT DOCUMENTS

| EP | 1 284 512 | 2/2003 |
| FR | 2 810 795 | 12/2001 |
| JP | 2002075396 A | 3/2002 |
| WO | WO 02/93669 | 5/2002 |

*Primary Examiner* — John S Maples
(74) *Attorney, Agent, or Firm* — Finnegan, Henderson, Farabow, Garrett & Dunner, LLP

(57) ABSTRACT

The present invention relates to a membrane electrochemical generator (100) characterized by improved electrical insulation and reduced volume. The membrane electrochemical generator (100) is fed with gaseous reactants and comprises a multiplicity of reaction cells (101) assembled in a filter-press configuration. Each of said reaction cells (101) is delimited by a pair of bipolar sheets (102), formed by a metallic central body (110) integrated in a frame (111) made of polymeric material. The polymeric material may be of the thermoplastic or thermosetting type and the frame (111) is laid on the metallic central body (110) by molding.

24 Claims, 12 Drawing Sheets

MEMBRANE ELECTROCHEMICAL GENERATOR

This is a divisional application of application Ser. No. 10/524,040, filed Feb. 9, 2005, now U.S. Pat. No 8,062,805, which is a National State Entry of PCT/EP2003/009554, filed Aug. 28, 2003, now published, both of which are incorporated herein by reference.

The present invention relates to a membrane electrochemical generator characterised by reduced weight, improved electrical insulation to the external environment and simplified assemblage. Processes of conversion of chemical to electric energy based on membrane electrochemical generators are known in the art. One example of prior art membrane electrochemical generator is outlined in FIG. 1. The electrochemical generator (1) is formed by a multiplicity of reaction cells (2) mutually connected in series and assembled according to a filter-press configuration. Each reaction cell (2) converts the free energy of reaction of a first gaseous reactant (fuel) with a second gaseous reactant (oxidant) without degrading it completely to thermal energy, thereby without being subject to the limitations of Carnot's cycle. The fuel is supplied to the anode compartment of the reaction cell (2) and consists for example of a mixture containing hydrogen or light alcohols, such as methanol or ethanol, while the oxidant is supplied to the corresponding cathode compartment and consists for instance of air or oxygen. The fuel is oxidised in the anode compartment simultaneously releasing $H^+$ ions, while the oxidant is reduced in the cathode compartment, consuming $H^+$ ions. An ion-exchange membrane separating the anode from the cathode compartment allows the continuous flow of $H^+$ ions from the anode to the cathode compartment while hindering the passage of electrons. The difference in the electric potential established at the poles of the reaction cell (2) is thereby maximised.

More in detail, each reaction cell (2) is delimited by a pair of electrically conductive flat-face bipolar sheets (3) enclosing, proceeding outwards, the ion-exchange membrane (4); a pair of porous electrodes (5); a pair of current collectors/distributors (7) realised by means of a reticulated conductive element of the type disclosed in U.S. Pat. No. 5,482,792, electrically connecting the bipolar sheets (3) to the porous electrodes (5) while simultaneously distributing the gaseous reactants; a pair of sealing gaskets (8) directed to seal the periphery of the reaction cell (2) to prevent the leakage of the gaseous reactants towards the external environment. In the bipolar sheets (3) and in the sealing gaskets (8) of each reaction cell (2), feed openings and discharge openings are present, not shown in FIG. 1, in communication with the cell anode and cathode chamber through distributing channels, also not shown in FIG. 1. The distributing channels are preferably obtained within the thickness of the sealing gaskets (8) and have a comb-like structure. They distribute and collect the gaseous reactants and the reaction products, the latter optionally mixed with the exhausts, in a uniform fashion within each reaction cell (2). The bipolar sheets (3) and the sealing gaskets (8) are also provided with openings for feeding and discharging a cooling fluid (typically deionised water) with the purpose of maintaining the electrochemical generator (1) at the required operating temperature. In a filter-press configuration, the coupling between the aforementioned openings determines the formation of two longitudinal manifolds directed to feed the gaseous reactants, two longitudinal manifolds directed to discharge the reaction products optionally mixed with exhausts and finally of coolant feed and discharge manifolds. Externally to the cell reaction (2) assembly, two terminal plates (11) are present, delimiting the electrochemical generator (1) and allowing, in co-operation with other devices such as springs or tie-rods, to keep the various components under compression ensuring thereby the gas sealing to the external environment and the longitudinal electric continuity. One of the two terminal plates (11) is provided with nozzles, not shown in FIG. 1, for connecting the aforementioned longitudinal manifolds to the external circuits. Moreover, both of the terminal plates (11) are provided with suitable holes (also not shown in FIG. 1) for housing the tie-rods by means of which the electrochemical generator (1) is tightened. As shown in FIG. 2, the electrochemical generator (1) of the prior art may also comprise a multiplicity of cooling cells (20) interposed between the reaction cells (2). The cooling cells (20) are similar to the reaction cells (2) except they do not enclose the electrochemical package composed by the ion-exchange membrane (4), the porous electrodes (5) and the catalytic layers (6). The cooling cells (20), deputed to coolant flowing, contain a conductive element equivalent to the above disclosed collectors (7) and directed in this case to establish the electric continuity between two adjacent bipolar sheets while increasing the thermal exchange coefficient.

The electrochemical generator (1) of the prior art, although advantageous under several aspects, nevertheless is affected by a few drawbacks. Firstly, in order to decrease the costs and avoid problems of fragility, the electrochemical generator (1) is preferably assembled with metal bipolar sheets, for instance made of stainless steel, rather than of graphite or the known polymer-graphite composites. This leads however to a remarkable weight and complexity, since the generator comprises a high number of components. The use of a high number of components also entails a significant amount of seals, and thus a higher risk of leakages besides a difficult assemblage, be it manual or automated, with high execution times and subject to inexactness which may have consequences on its correct functioning. Other disadvantages associated to the structure of the above described electrochemical generator are given by the lack of electrical insulation to the external environment, by the contact of metal with fluids, particularly referred to the coolant, taking place within the longitudinal manifolds and giving rise to possible shunt currents, and finally by the dispersion of the thermal power produced by the generator to the external environment.

It is an object of the present invention to provide a membrane electrochemical generator comprising metal bipolar sheets, overcoming the drawbacks of the prior art.

For a better understanding of the present invention, some embodiments thereof are described hereafter, as mere non limiting examples and making reference to the attached drawings, wherein.

Figure 1:
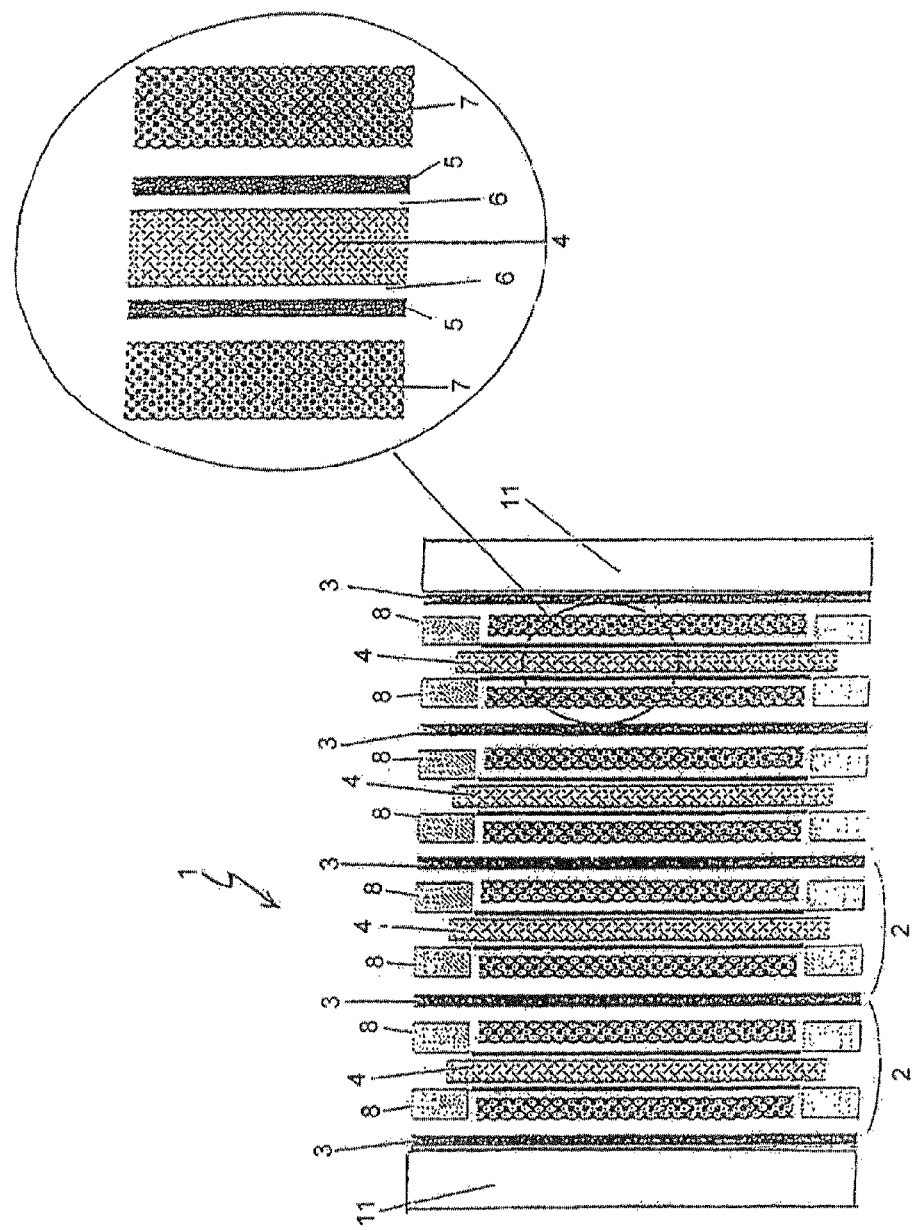
FIG. 1 shows an exploded side-view of a first embodiment of a membrane electrochemical generator according to the prior art.
Figure 2:
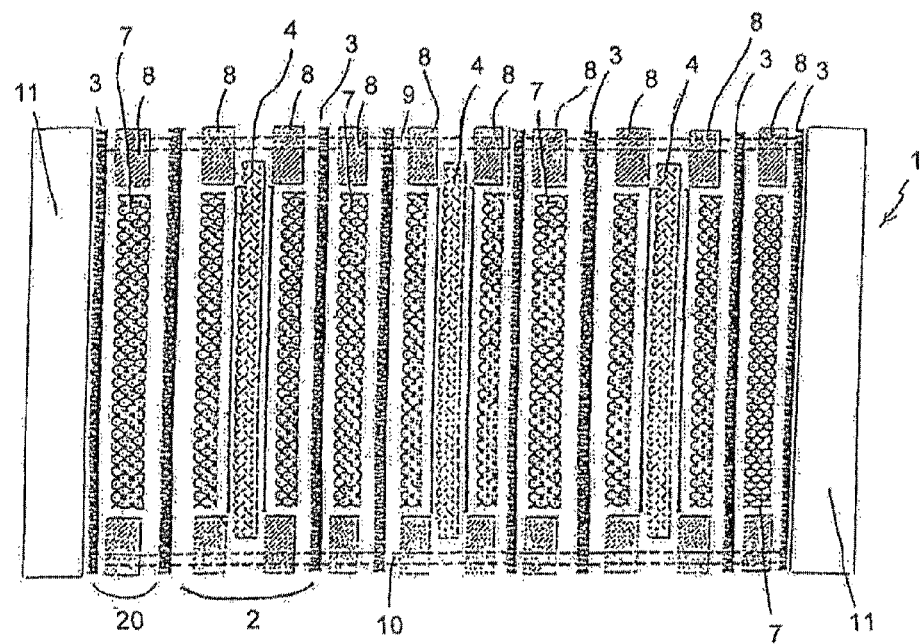
FIG. 2 shows an exploded side-view of a second embodiment of the membrane electrochemical generator of FIG. 1.
Figure 3:
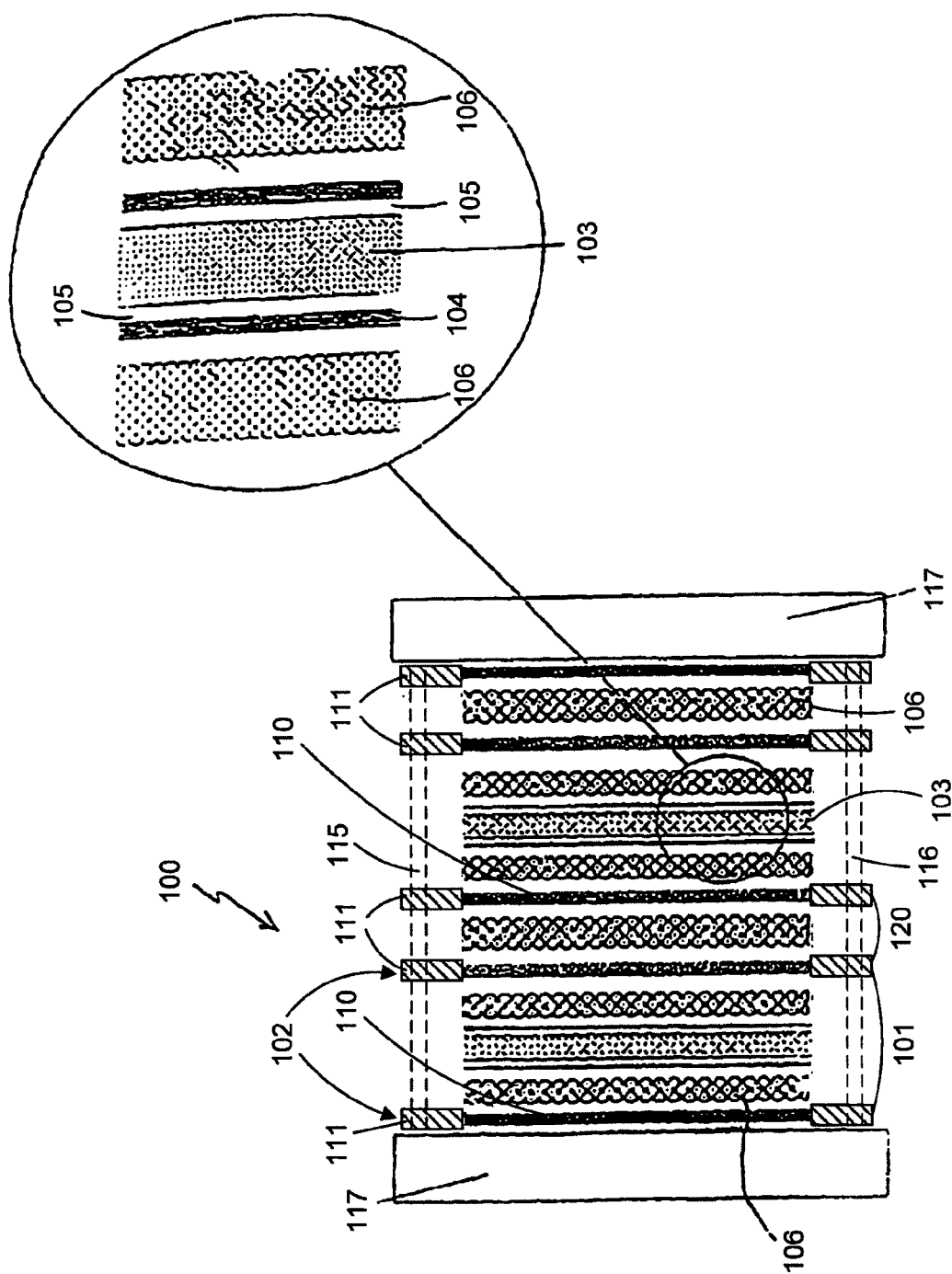
FIG. 3 shows an exploded side-view of an embodiment of a membrane electrochemical generator according to the invention.

FIG. 3 shows an embodiment of electrochemical generator (100) in accordance with the invention formed by a multiplicity of reaction cells (101) mutually connected in series and assembled in a filter-press configuration, with cooling cells (120) intercalated thereto, equivalent to the above discussed cooling cells (20) of FIG. 2, in a 1:1 ratio to the reaction cells. In other embodiments such ratio may be different, such as 1:2 or 1:3. Each reaction cell (101) is delimited by a pair of flat-face bipolar sheets (102), among which are comprised, proceeding outwards, an ion-exchange membrane (103); a pair of porous electrodes (104); a pair of catalytic layers (105) deposited at the interface between the membrane (103) and each of the porous electrodes (104); a pair of current collectors/distributors (106), realised by means of a reticulated metallic element of the type disclosed in U.S. Pat. No. 5,482,792, electrically connecting the bipolar sheets (102) to the porous electrodes (104) while simultaneously distributing the gaseous reactants.

Figure 4:
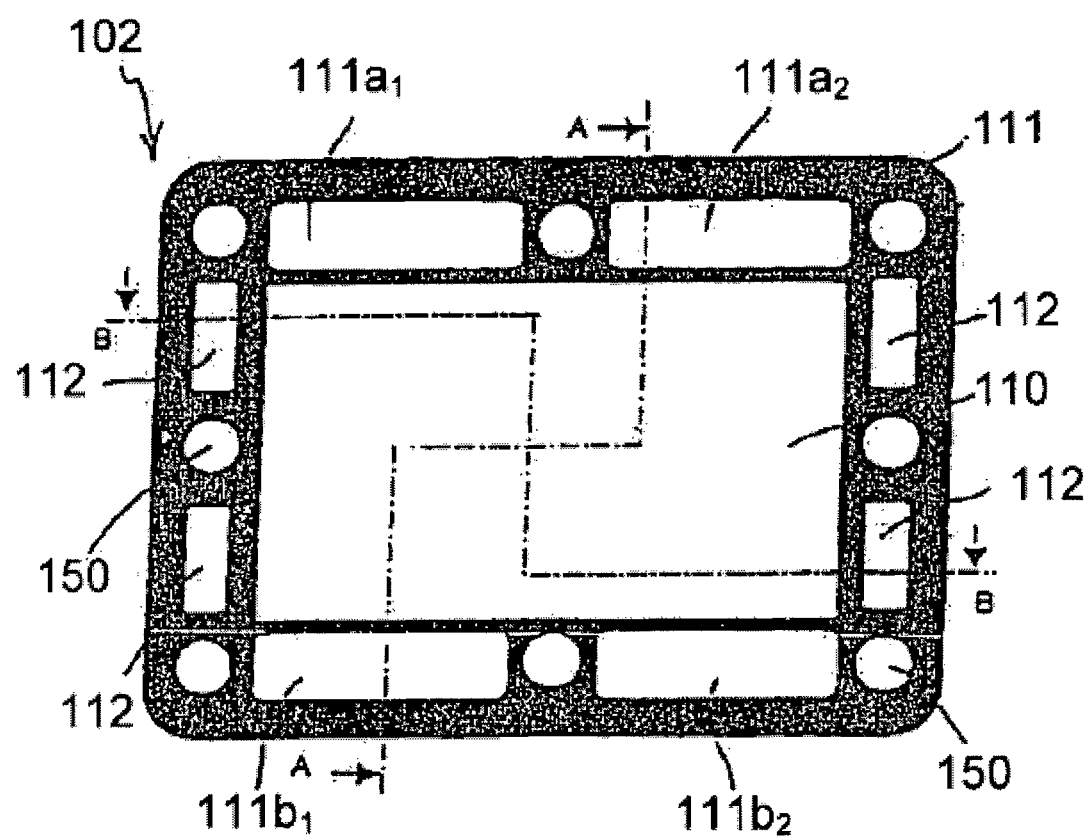
FIG. 4 shows a front-view of a component of the electrochemical generator of FIG. 3.
Figure 5A:
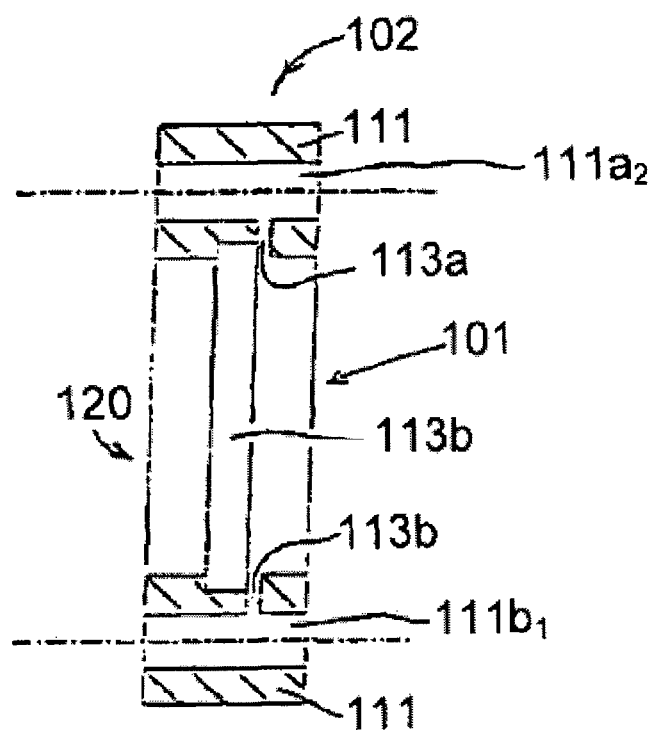
FIG. 5a shows a view along section A-A of the component of FIG. 4.
Figure 5B:
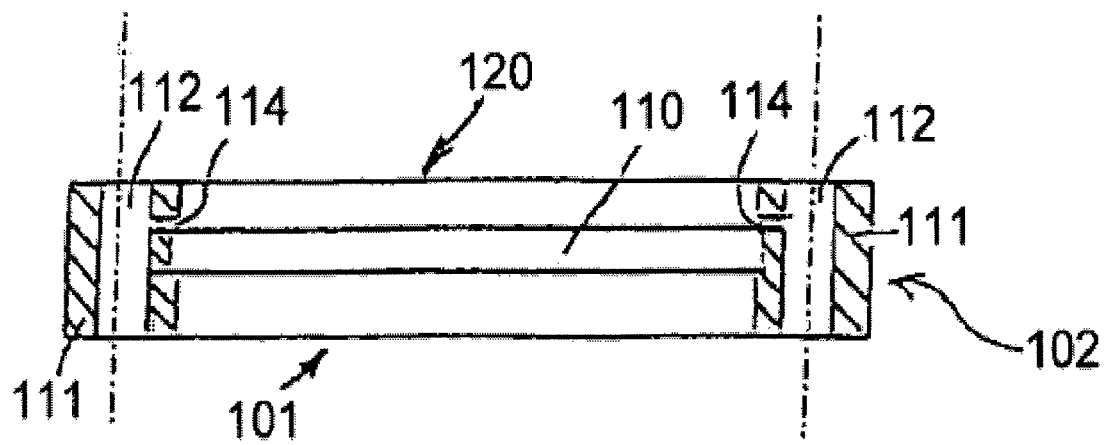
FIG. 5b shows a view taken along section B-B of the component of FIG. 4.

As shown more in detail in FIGS. 4, 5a, 5b, the bipolar sheets (102) are formed by a central metallic body (110), with dimensions slightly exceeding those of the active area of the reaction cells (101), integrated in a frame (111) made of polymeric material (for instance of thermoplastic or thermosetting type). The frame (111) is laid on the central metallic body (110) by moulding or gluing, optionally of separate pieces. The frame (111) advantageously takes care of all the functions of the sealing gasket (8) of the electrochemical generator of the prior art, which may therefore be omitted.

As shown in FIG. 4, the frame (111) presents first and second openings ($111a_1$, $111a_2$) for the passage of the gaseous reactants, respectively fuel and oxidant, first and second openings ($111b_1$, $111b_2$) for the discharge of the reaction products optionally mixed with exhausts, openings (112) for feeding and discharging a cooling fluid. The frame (11) is also provided with a multiplicity of holes (150) for housing tie-rods by means of which the electrochemical generator (100) is tightened. Furthermore, the frame (111) presents distributing channels (113a, 113b) (FIG. 5a) and cooling channels (114) (FIG. 5b), all obtained within the thickness of the frame itself. The distributing channels (113a) and (113b) are positioned at the interface with the central metallic body (110) and put the first and second openings ($111a_i$, $111a_2$) (only one of which is shown in FIG. 5a) and, respectively, the first and second openings ($111b_1$, $111b_2$) (only one of which is shown in FIG. 5a) in direct communication with the interior of the reaction cell (101) while the cooling channels (114) put the openings (112) in communication with the interior of the cooling cell (120). In a filter-press configuration, the coupling between openings ($111a_i$, $111a_2$) and openings ($111b_1$, $111b_2$) of all the frames (111) determines respectively the formation of two longitudinal manifolds (115) and two longitudinal manifolds (116), while the coupling between the openings (112) of all the frames (111) also determines the formation of relevant manifold, although they are not shown in FIG. 3 for the sake of simplicity. The two longitudinal manifolds (115), only one of which is shown in FIG. 3, are directed to feeding the gaseous reactants, the two longitudinal manifolds (116), only one of which is shown in FIG. 3, are directed to withdrawing the reaction products (water) optionally mixed with exhausts (gaseous inerts and unconverted fraction of reactants), the manifolds formed by the coupling of openings (112) are directed to feeding and extracting the cooling fluid.

Externally to the assembly of reaction cells (101), two terminal plates (117) are present (FIG. 3), delimiting the electrochemical generator (100). One of the two terminal plates (117) is provided with nozzles, not shown in FIG. 3, for the hydraulic connection of the various longitudinal manifolds to the external circuits. Moreover, both of the terminal plates (117) are provided with appropriate holes (also not shown in FIG. 3) for housing the tie-rods.

Figure 6:
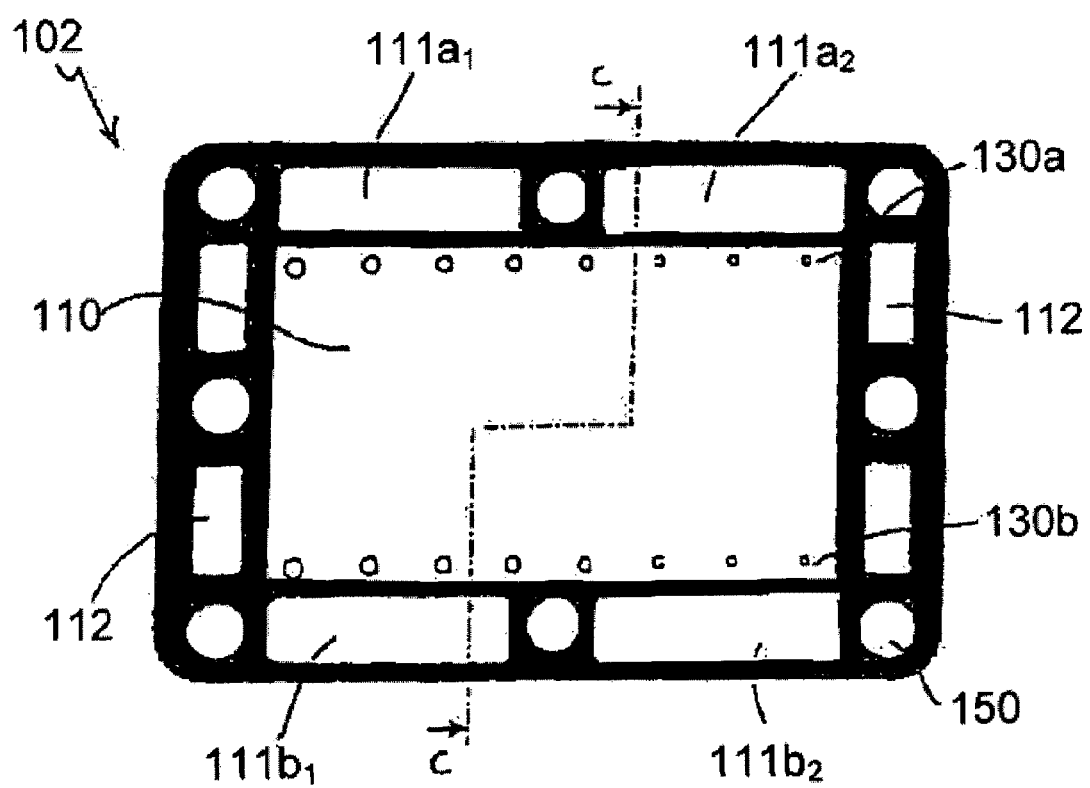
FIG. 6 shows a front-view of a further embodiment of a component of the membrane electrochemical generator of FIG. 3.

In case the cooling cells (120) are interposed in a 1:1 ratio to the reaction cells (101), as shown in the embodiment of FIG. 3, the central metallic body (110) of the bipolar sheets (192) may be provided with a multiplicity of calibrated holes (130a, 130b) with diameter comprised between 0.1 and 5 mm, as shown in FIG. 6. Through the multiplicity of calibrated holes (130a) and (130b), respectively, the gaseous reactants flow into the reaction cell (101) and the reaction products and exhausts are withdrawn from the same, as will be illustrated more in detail hereafter. In a construction alternative, the calibrated holes (130a) and (130b) have regularly varied diameters with the purpose of ensuring an equal distribution of gaseous reactants and withdrawal of products. The holes (130a) and (130b) are respectively positioned below and above the inner edges of frame (111) on the side opposite to that containing the distributing channels (131) and (132). The distance of the holes from the edges of frame (111) is preferably about 1 mm for a better exploitation of the reaction cell (101) active area.

Figure 7:
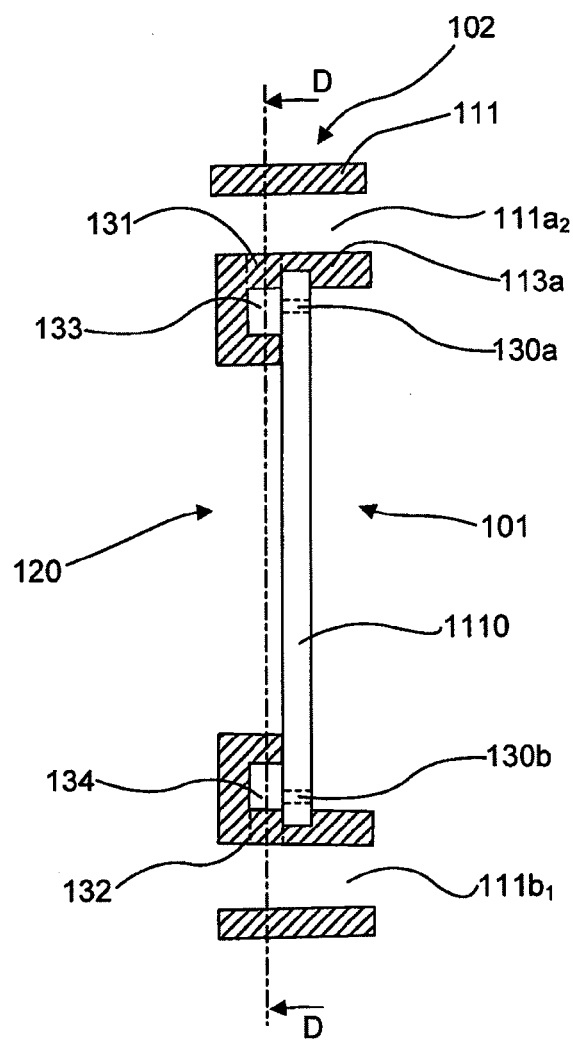
FIG. 7 shows a view along section C-C of the component of FIG. 6.
Figure 8:
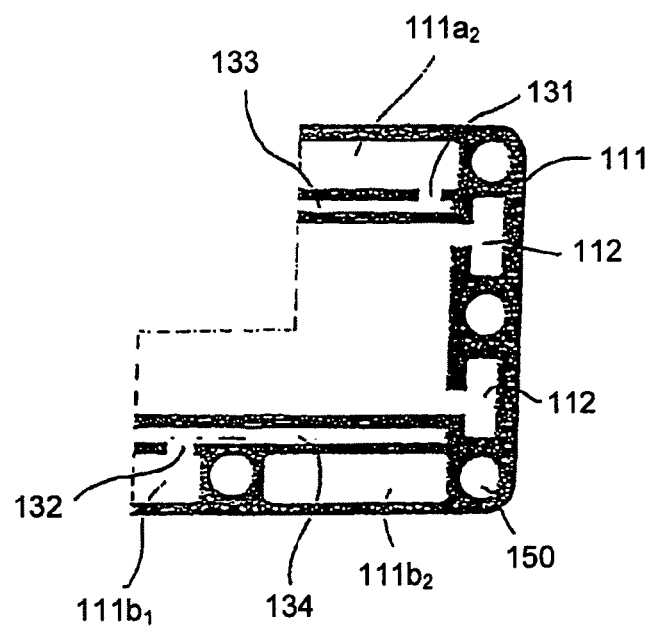
FIG. 8 shows a view along section D-D of the component of FIG. 7.

Making now reference to FIG. 7, representing a side-view of the bipolar sheet of FIG. 6 along section C-C, the frame (111) presents, on the side opposite to cooling cell (120), a distributing zone of gaseous reactants (131) in communication with first and second openings ($111a_1$, $111a_2$), and a collection zone of the reaction products and exhausts (132) in communication with first and second openings ($111b_1$, $111b_2$). The distributing zone of gaseous reactants (131) and the collection zone of the reaction products and exhausts (132) are both obtained within the thickness of the frame (111). On the side opposite to the reaction cell (101), the frame (111) is free of channels and its thickness on this side may be optimised as a function of the thickness of the membrane-electrode-collector assembly without further constraints. The distributing (131) and collection (132) zones are shown in FIG. 8, representing a front-view of the section of bipolar sheet (102) of FIG. 7 along the D-D plane. Channels (133) and (134) coincide with the alignment of holes (130a) and (130b).

In this case, the electrochemical generator (100) operates as follows: the gaseous reactants (fuel and oxidant), which are supplied to the electrochemical generator (100) through the longitudinal manifolds (115), flow to the distributing zone (131). from here, the gaseous reactants flow across the channel (133) and through the multiplicity of calibrated holes (130a), and are injected into the reaction cell (101). The reaction products and exhausts produced therein pass in their turn through the multiplicity of calibrated holes (130b) and across the channel (134) reaching the collection zones (132) and the manifolds (116) through which they exit the electrochemical generator (100).

Figure 9:
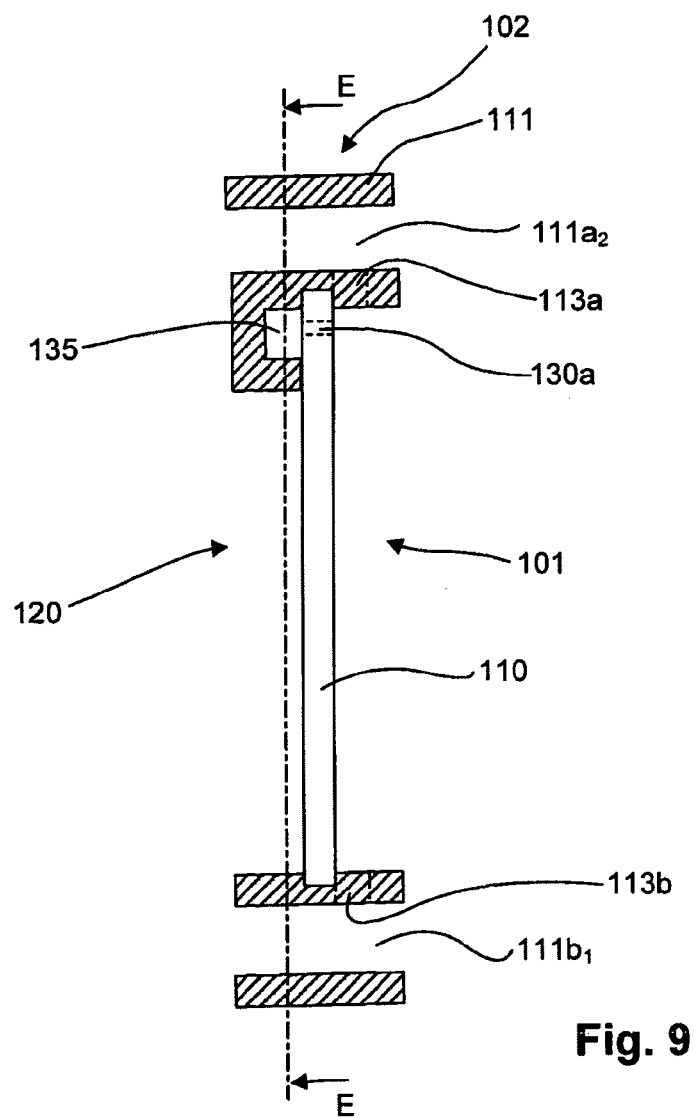
FIG. 9 shows a view along section C-C of an alternative embodiment of the component of FIG. 6.
Figure 10:
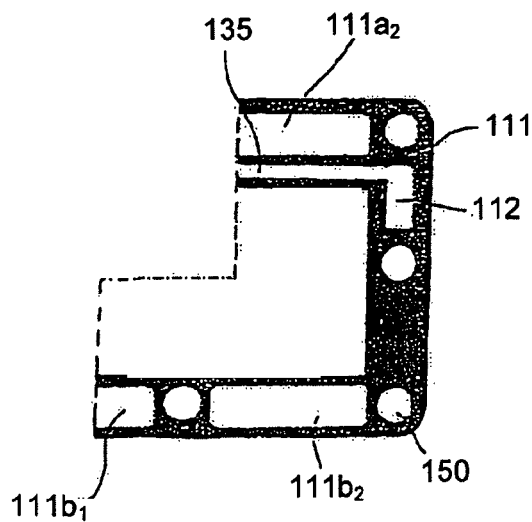
FIG. 10 shows a view along section E-E of the component of FIG. 9.
Figure 11:
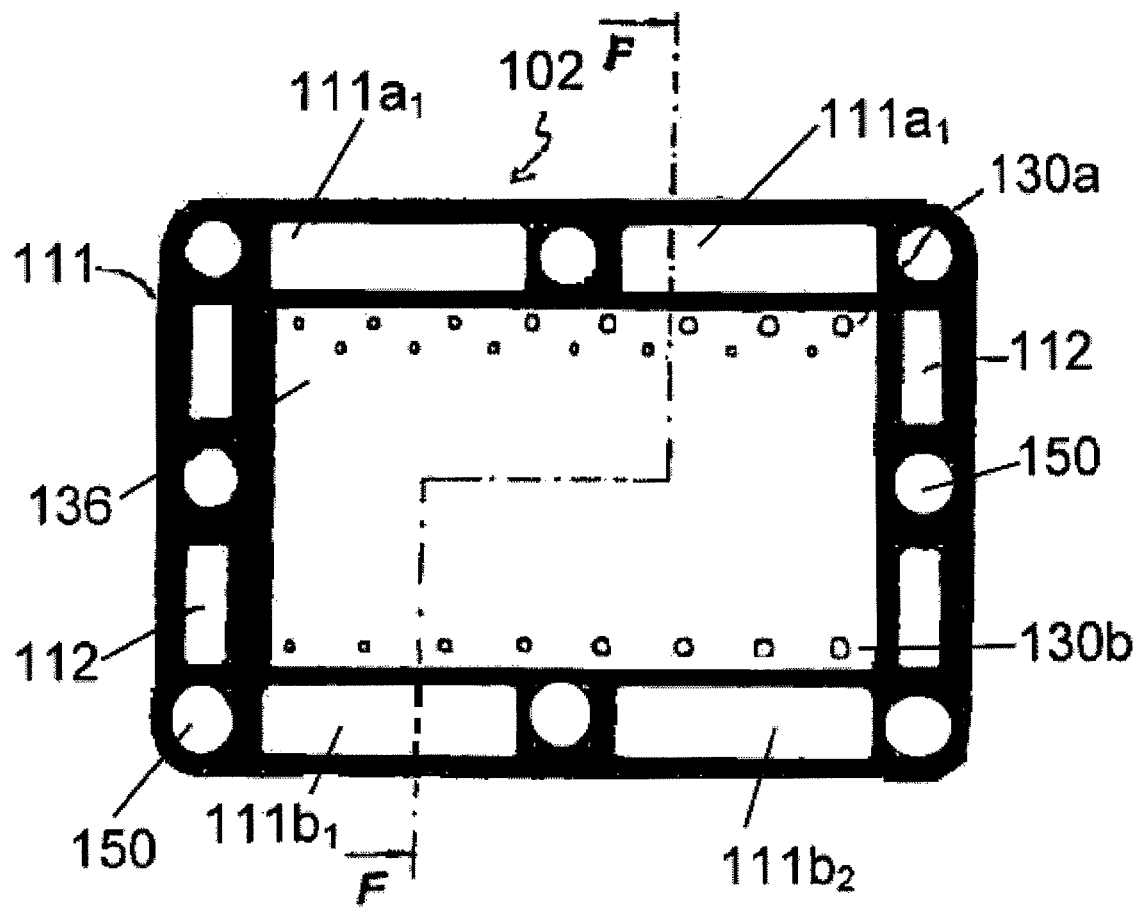
FIG. 11 shows a front-view of a further embodiment of a component of the membrane electrochemical generator of FIG. 3.
Figure 12:
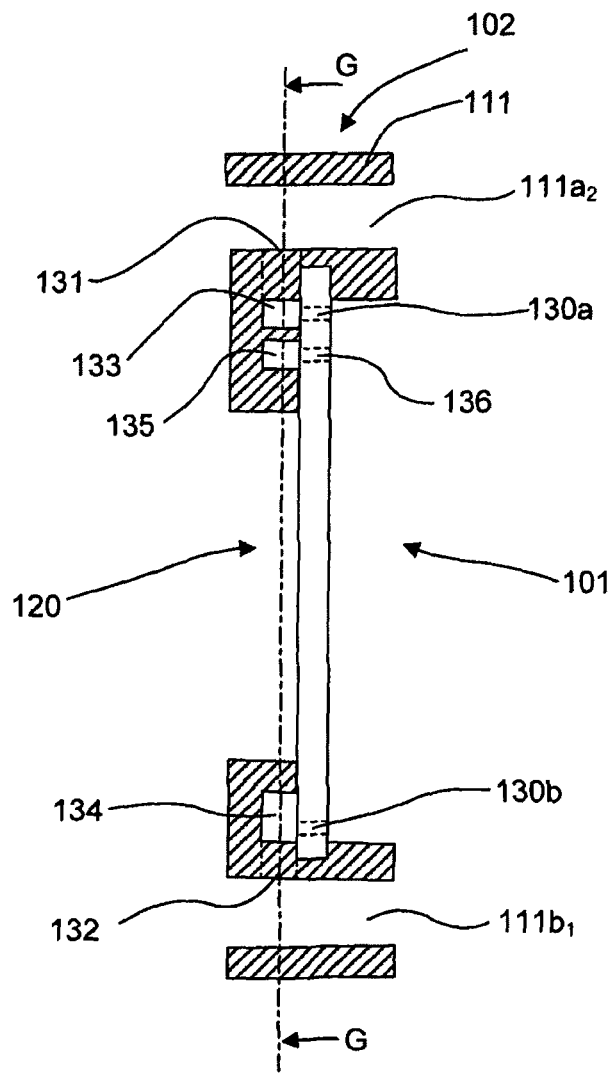
FIG. 12 represents a section of the component of FIG. 11 along section F-F.
Figure 13:
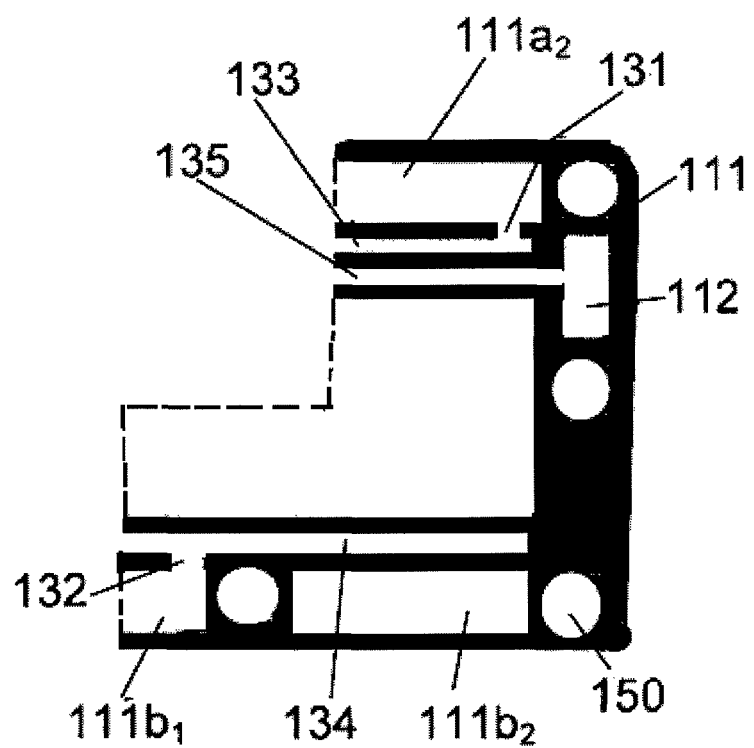
FIG. 13 shows a view along section G-G of the component of FIG. 12.

In an alternative embodiment, the holes (130a) are used for injecting water directly into the reaction cell instead than for the injection of the gaseous reactants as seen above. In this case, the injected water plays a double role, namely providing for the humidification of the gases and the membrane (103) and for the withdrawal of the heat of reaction upon partially evaporating. The unevaporated water is extracted from the reaction cell together with the products and exhausts through the collection zone in communication with a longitudinal discharge manifold. The holes (130b) can therefore be eliminated. By virtue of the cooling effect produced by the water directly injected into the reaction cell, the supply of coolant, for instance water, to the cooling cells (120) is no more required. The cells (120), although maintaining the structure of FIG. 3 comprising the element (106), retain the sole function of establishing the electric contact between the metallic bodies (110) of two adjacent bipolar sheets (102). Taking FIG. 6 as reference, the section along the line C-C is represented, as regards this specific case, in FIG. 9, wherein the common parts with the previous figures are indicated with the same reference numbers. For the sake of better understanding, the section of the bipolar sheet of FIG. 9 along the line E-E is represented in FIG. 10, wherein the development of the channel (135) coinciding with holes (130a) and permitting the injection of water coming from (112) through the same is evidenced. The supply of reactant gases and the withdrawal of products and exhausts takes place, as indicated in FIG. 5a, through the channels (113a) and (113b). In this case, the thickness of the gasket (111) on the reaction cell side, similarly to the case of the embodiment of FIG. 5a, is limited by the necessity of housing the channels (113a) and (113b) and cannot be freely optimised as allowed by the embodiment of FIG. 7. It is possible to enjoy such advantage again, simultaneously making use of the effective direct water injection, by means of a further embodiment of the invention, characterised by resorting to a frame design encompassing the two concepts of gas distribution and water injection outlined in FIGS. 7 and 9. Such embodiment is represented in FIG. 11 as a front-view of bipolar sheet (102) wherein the common parts with the previous figures are indicated with the same reference numbers. As it can be seen, the central metallic body (110) is provided with a double row of holes, respectively 130a for feeding the gaseous reactants and (136) for injecting water, and with a single row of holes 130b directed to the withdrawal of reaction products, exhausts and residual water. For the sake of a better understanding, the section of the frame (111) along the line F-F is represented in FIG. 12 showing the section of the distributing channel (135) of the water to be injected into the reaction cell (101) through the holes (136). A front-view of a further section of the bipolar sheet along the line G-G of FIG. 12 is shown in FIG. 13. The advantages obtained with the above disclosed invention are the following:

a) reduction in weight of the electrochemical generator according to the invention: the electrochemical generator made in accordance with the present invention provides the use of bipolar sheets with a metallic portion having dimensions slightly superior to those of the reaction cell active area, while the metallic bipolar sheets of the prior art have dimensions substantially coinciding with the whole front area of the generator; the esteemed weight reduction due to this modification is about 30%.

b) reduction in the number of components making up the electrochemical generator according to the invention: the reduction in the number of components entails a remarkable advantage in terms of reduction of the time for the assemblage and of the relevant costs, besides decreasing the occurrence of errors. For instance, the assemblage of a generator according to the prior art of FIG. 2 comprising n reaction cells requires 3×n gaskets and 2×n bipolar plates for a total of 5×n components (without considering the components relative to the electrochemical package, which remain unvaried); making use of the electrochemical generator (100) of the invention according to the embodiment of FIG. 3, only 2×n components are required.

c) reduction in the number of seals: ensuring a leak-free sealing in the assemblage of a multiplicity of parts made of diverse materials is one of the main problems to be faced during the construction of generators, and such problems is not always of straightforward resolution. The assemblage of the prior art generator of FIG. 2 with n reaction cells entails 5×n sealed surfaces, reduced to 2×n when bipolar sheets in accordance with the invention are employed.

d) better alignment and centring of the components: the bipolar sheets in accordance with the invention allow to improve the component alignment during the assemblage of the generator since, as mentioned above, the amount of components is much reduced and the polymer frames are automatically in the right position, contrarily to what happens with the prior art technology, wherein the components to assemble are many and the positioning of the gaskets, which are not secured to the bipolar sheets, is undoubtedly difficult. Also the centring of the other elements of the electrochemical generator (current collector/distributor, electrodes and membrane) is made simpler by the presence of a predisposed seat delimited by the frame (111).

e) improved external electrical insulation: the bipolar sheets according to the invention allow to electrically insulating the generator from the external environment while reducing the dispersion of thermal power.

f) absence of fluid to metal contacts in the feed and discharge manifolds: another relevant issue when metallic components are used within electrochemical generators is trying to reduce at most the contact of metals with fluids (humidified gaseous reactants, coolant) so as to reduce the risks of corrosion and to suppress the shunt currents. The use of the bipolar sheets according to the invention allows eliminating the metallic parts both from the feed and discharge manifolds of the humidified gaseous reactants and from the feed and discharge manifolds of the coolant since all these ducts are obtained within the polymer frame.

The production of the bipolar sheets of the invention consisting of a central metallic body optionally provided with holes for distribution and collection and integrated with a frame of plastic material incorporating the different openings and channels may be achieved with one of the methods listed hereafter:

application of leachable elements shaped as the sections of the various channels to the metallic body, moulding of the plastic material in order to form the integral frame and leaching with a suitable reactant after optional cooling in the case of thermoplastic materials or after completion of polymerisation in the case of thermosetting materials. An adequate leachable material is aluminium, which is easily dissolved with caustic soda. The plastic material of the frame must have mechanical characteristics, in particular minimum long-term deformability at the operative temperature and under the typical operative compression conditions, suitable for maintaining the passage section of the various channels substantially unvaried.

application of preformed element having the shape of the required channels on the metallic body followed by moulding of the plastic material so as to form the integral frame. the preformed materials may be made of metal, preferably stainless steel, or plastics: if the mechanical resilience to compression of the preformed elements is high, the above constraints of low deformability for the frame material are overcome.

pre-forming of the frames, e.g. by moulding, optionally in two sections, each consisting of a face of said frame and comprising its own channels, and assemblage with the metallic body by thermal bonding or preferably by gluing with suitable adhesive, in order to prevent any damage to the section of passage of the channels. The selection of the frame material is in this case subjected, besides the constraints of minimum deformability, also to those of compatibility with the commercial adhesives, among which the thin film adhesives are preferred.

To improve the adhesion between metallic body and frame material, with an adhesive optionally interposed, the metallic body is preferably subjected to pre-treatments such as fine sandblasting and/or chemical attacks, with the aim of producing a micro-rough and chemically reactive surface. A further measure, equally directed to impart adhesion between metallic body and frame, may consist of providing the metallic body with openings in the peripheral zone, wherein the frame material may penetrate during the moulding step thereby establishing a continuity between the two faces of the frame itself.

The above description shall not be understood as limiting the invention, which may be practised according to different embodiments without departing from the scopes thereof, and whose extent is solely defined by the appended claims.

In the description and claims of the present application, the word "comprise" and its variation such as "comprising" and "comprises" are not intended to exclude the presence of other elements or additional components.

The invention claimed is:

1. A membrane electrochemical generator, comprising:
   a multiplicity of reaction cells, wherein each of said reaction cells comprises a metallic reticulated current collector, an active area, and is delimited by two bipolar sheets,
   each of said bipolar sheets comprises a metallic central body having a dimension larger than the active area of the reaction cells and a frame made of a polymeric material,
said frame comprises:
   a first feed opening and a second feed opening for the passage of gaseous reactants, at least one of the first and the second feed openings also provides a passage for cooling water to enter the reaction cell,
   a first discharge opening and a second discharge opening for discharging reaction products, at least one of the first and the second discharge openings also provides a passage for cooling water to exit the reaction cell,
   a multiplicity of channels each having two ends, wherein one end opens to the active area of the reaction cell while the other end opens at one of the first feed opening, the second feed opening, the first discharge opening, and the second discharge opening.

2. A generator of claim 1, wherein said polymeric material is of the thermoplastic type.

3. A generator of claim 1, wherein said polymeric material is of the thermosetting type.

4. A generator of claim 1, wherein said frame is integrated with said central metallic body by moulding or gluing.

5. A generator of claim 4 wherein
   said channels are formed using a method comprising steps of applying leachable elements in the shape of the channels on the metallic central body, molding a polymeric frame on the metallic central body, and dissolving the leachable element in a chemical solution.

6. A generator of claim 5 wherein said leachable elements are made of aluminum and said chemical solution is caustic soda.

7. A generator of claim 4 wherein said metallic central body is previously provided with preformed elements having the shape of said channels.

8. A generator of claim 7 wherein said preformed elements are made of metal or plastics.

9. A generator of claim 8 wherein said metal is stainless steel.

10. A generator of claim 1 wherein said frame consists of two preformed components containing said channels.

11. A generator of claim 10 wherein each of said two preformed components constitutes a face of said frame.

12. A generator of claim 10 wherein said two components are assembled with each other and with said metallic central body by thermal bonding or gluing with an adhesive.

13. A generator of claim 4 wherein said metallic central body has a micro-rough and chemically reactive surface obtained by sandblasting or chemical attack or both.

14. A generator of claim 4 wherein said metallic central body comprises openings in the peripheral zone covered by the frame and having materials in the frame penetrating the openings.

15. A generator of claim 1 wherein in a filter-press configuration,
   said frames on bipolar sheets are adjacent to each other so that corresponding feed openings in each frame are aligned to form longitudinal feed manifolds, corresponding discharge openings in each frame are aligned to form longitudinal discharge manifolds.

16. A generator of claim 1 wherein said frame further comprises a multiplicity of holes where tie-rods for tightening said electrochemical generator pass through.

17. A generator of claim 1 wherein said metallic central body comprises a multiplicity of first calibrated holes for the passage of said gaseous reactants and a multiplicity of second calibrated holes for the discharge of reaction products.

18. A generator of claim 17 wherein said first calibrated holes are aligned with feed channels of said frame and that said second calibrated holes are aligned with discharge channels of said frame.

19. A generator of claim 17 wherein said first and second calibrated holes are placed about 1 mm from the inner edge of said frame.

20. A generator of claim 17 wherein said first calibrated holes have a diameter between 0.1 and 5 mm.

21. A generator of claim 1 wherein said metallic central body comprises a multiplicity of calibrated holes for injecting water into said reaction cells, said holes are placed about 1 mm from the inner edge of said frame.

22. A generator of claim 21 wherein said aligned calibrated holes are aligned with water distributing channels.

23. A generator of claim 1 wherein said central body comprises a multiplicity of calibrated holes for distributing gaseous reactants, a multiplicity of calibrated holes for injecting water and a multiplicity of calibrated holes for discharging products, exhausts and residual injected water, each of said calibrated holes positioned in correspondence to one of said feed or of said discharge channels.

24. A generator of claim 23 wherein said calibrated holes for distributing the gaseous reactants and said calibrated holes for discharging the products, the exhausts and the residual injected water are placed about 1 mm from the edges of said frame.

* * * * *

UNITED STATES PATENT AND TRADEMARK OFFICE
CERTIFICATE OF CORRECTION

| | | |
|---|---|---|
| PATENT NO. | : 8,592,094 B2 | Page 1 of 1 |
| APPLICATION NO. | : 12/839066 | |
| DATED | : November 26, 2013 | |
| INVENTOR(S) | : Liotta et al. | |

It is certified that error appears in the above-identified patent and that said Letters Patent is hereby corrected as shown below:

In the Claims

Claim 18, Col. 8, Line 47, "and that" should read as --and--.

Signed and Sealed this
Twenty-seventh Day of May, 2014

Michelle K. Lee
*Deputy Director of the United States Patent and Trademark Office*